(12) United States Patent
Duffner (10) Patent No.: US 12,384,083 B2
(45) Date of Patent: Aug. 12, 2025

(54) METHOD FOR PROVIDING AN OPERATING SYSTEM OF A MACHINE CONTROLLER

(71) Applicant: ARBURG GMBH + CO KG, Loßburg (DE)

(72) Inventor: Eberhard Duffner, Starzach (DE)

(73) Assignee: ARBURG GMBH + CO KG, Lossburg (DE)

(*) Notice: Subject to any disclaimer, the term of this patent is extended or adjusted under 35 U.S.C. 154(b) by 506 days.

(21) Appl. No.: 17/613,570

(22) PCT Filed: Jun. 12, 2020

(86) PCT No.: PCT/EP2020/066252
§ 371 (c)(1),
(2) Date: Nov. 23, 2021

(87) PCT Pub. No.: WO2020/254196
PCT Pub. Date: Dec. 24, 2020

(65) Prior Publication Data
US 2022/0242021 A1    Aug. 4, 2022

(30) Foreign Application Priority Data
Jun. 19, 2019 (DE) ............... 10 2019 208 937.2

(51) Int. Cl.
*B29C 45/76* (2006.01)
*G06F 9/455* (2018.01)
(Continued)

(52) U.S. Cl.
CPC .............. *B29C 45/76* (2013.01); *G06F 9/455* (2013.01); *G06F 16/288* (2019.01); *G16Y 10/25* (2020.01); *G16Y 40/30* (2020.01)

(58) Field of Classification Search
CPC .......... B29C 45/76; B29C 2945/76946; B29C 45/766; B29C 2945/76939; G06F 9/455; G06F 16/288; G16Y 10/25; G16Y 40/30
See application file for complete search history.

(56) References Cited

U.S. PATENT DOCUMENTS 5,216,617 A     6/1993  Kamiguchi et al.
9,218,228 B2   12/2015  Schuepp
(Continued)

FOREIGN PATENT DOCUMENTS

DE    102011005062 A1    9/2012
DE    102019208037 A1   12/2020
(Continued)

OTHER PUBLICATIONS

Suwannasri et al. "An Automated Plastic Injection Molding Machine Selection System based on Fuzzy Logic Using MATLAB" from " TNI Journal of Engineering and Technology vol. 2 No. 1 Jan.-Jun. 2014" (Year: 2014).*

(Continued)

*Primary Examiner* — Yuhui R Pan
(74) *Attorney, Agent, or Firm* — CANTOR COLBURN LLP (57) ABSTRACT

An operating system of a machine controller for an injection molding machine for processing plastics is provided on a target system having a processor. Information about an operating system of a machine controller of an injection molding machine is provided. The operating system can be configured to the characteristics of the injection molding machine by means of configuration data of a first machine configuration. The operating system is installed with all the configuration data as a digital twin, using a hardware-independent app to convert the information for the target system. On the target system, a new setting dataset is created or an existing setting dataset for producing injection-molded (Continued)

parts is changed, the setting dataset being able to run on the injection molding machine. The setting dataset created or changed on the target system is transferred to the injection molding machine and the injection molding machine is operated therewith.

14 Claims, 4 Drawing Sheets

(51) Int. Cl.
 G06F 16/28 (2019.01)
 G16Y 10/25 (2020.01)
 G16Y 40/30 (2020.01)

(56) References Cited

U.S. PATENT DOCUMENTS

| | | | |
|---|---|---|---|
| 2006/0082009 A1* | 4/2006 | Quail | B29C 45/766 700/200 |
| 2009/0036111 A1* | 2/2009 | Danford | H04L 41/0893 455/419 |
| 2011/0106284 A1* | 5/2011 | Catoen | B29C 45/76 700/200 |
| 2012/0185077 A1 | 7/2012 | Muller | |
| 2013/0345855 A1* | 12/2013 | Tsai | B29C 45/766 700/200 |

FOREIGN PATENT DOCUMENTS

| | | |
|---|---|---|
| EP | 0537912 A | 4/1993 |
| EP | 1297941 A2 | 4/2003 |
| JP | H06134831 A | 5/1994 |
| JP | 2014156096 A | 8/2014 |
| WO | 2006024606 A1 | 3/2006 |
| WO | 2006098451 A1 | 9/2006 |
| WO | 2007004291 A1 | 1/2007 |
| WO | 2018087854 A1 | 5/2018 |

OTHER PUBLICATIONS

Nezhad et al. "An Intelligent System for Plastic Injection Molding Process Design" from "Journal of Materials Processing Technology 63 (1997) 458-462" (Year: 1997).*
International Search Report for corresponding application PCT/EP2020/066252 filed Jun. 12, 2020; Mail date Sep. 4, 2020.
Chinese Office Action for Patent Application No. 2020800447983 dated Sep. 25, 2023.

* cited by examiner

METHOD FOR PROVIDING AN OPERATING SYSTEM OF A MACHINE CONTROLLER

CROSS REFERENCE TO RELATED APPLICATIONS

The present application relates to and claims the priority of German patent application 10 2019 208 937.2 filed on Jun. 19, 2019, the disclosure content of which is hereby incorporated by reference in its entirety.

TECHNICAL FIELD

The disclosure relates to a method for providing an operating system of a machine control system for an injection molding machine for processing plastics and other plasticizable masses, on a target system which is independent of the injection molding machine.

Where, in the context of this disclosure, mention is made of an "executable settings dataset", this refers to a dataset of settings data with which an injection molding machine can be operated for the production of injection molded parts, typically without the need for a further intervention by a user.

The expression "converted operating system information" should be understood in the context of this application to be information concerning an operating system which is adapted to a particular target system. The operating system of an injection molding machine, for example, is merely a code which, by means of the reading in of the specific machine configuration data, becomes the specific machine.

A "digital twin" should be understood in the context of this application to be a digital copy of a real machine, for example, an injection molding machine. The digital twin has all the properties, specifications and settings possibilities of the real machine. The digital twin is preferably one-to-one from the operating system code, which by means of exactly the same configuration data is executable on another target operating system, for example, by means of an App.

BACKGROUND

From DE 10 2011 005 062 A1, a method is known for providing data of a field device by means of a cloud solution. The field device is arranged on an automation technology network and is connected to other field devices via a data bus. The field devices communicate at least with a server of a service provider so that a preconfigured dataset can be augmented with customer-specific and/or user-specific data. A dataset extended with the additional data is then made available to a remotely located client.

In the field of plastics injection molding machines, a method for the interactive control of a machine is known from EP 0 573 912 B1, wherein in a data processing unit, a basic knowledge set and a dataset relating to the fundamental rules of the operation of an injection molding machine are fed in. By means of a sequence editor, a machine operation can be generated, wherein the machine checks each input for plausibility and makes interactive proposals for the augmentation of the already existing sequence.

A device for processing plastics is disclosed in DE 10 2004 041 891 B3. The device has recording means which record the raw material supply or are provided on the forming unit and/or the plasticizer unit and serve for recording process and/or material parameters. Through evaluating means, data of the recording means can be determined with regard to the expected production duration and/or the expected production costs. A control apparatus for controlling the material feed apparatus can be configured as the end device (client) and can be connected to a data network, by means of which different data services are made available. It is also possible to modify parameters of a production process by means of the data services of the control apparatus.

In WO 2006/098451 A1, a method for controlling and operating a production cell for producing plastics injection molded parts is disclosed. Therein, machine processes are formed on the basis of functionally complete components which together form a domain model, created, administered and executed with the aid of a domain language. A particular component can thus be programmed component-oriented and/or command-oriented. For example, the components of the molding tool can thus be programmed through the commands Open and Close.

CH 705456 A1 discloses a computerized machine control system which comprises an application-independent, machine-specific part and an application-specific, machine-independent part. By this means, a better integration of machines from different manufacturers can be realized.

A device and a method for controlling and for operating a production cell are disclosed in US 2012/0185077 A1. Machine processes that are based upon machine control components are created, administered and executed with the aid of a domain language. For a free configurability of machine control components, it is proposed to select a machine control component from a set of pre-determined component types and to assign to a machine control component a permissible technology from a set of technologies, wherein for each technology of a component type, a logic is stored which comprises and defines the interfaces required for the machine control component and the technology.

BRIEF SUMMARY

The disclosure makes available to a processor a copy of a machine control system, so that settings data can be created or modified independently of the injection molding machine, manufacturer data being referred to if necessary.

According to the method, information relating to an operating system of a machine control system of an injection molding machine is provided, said operating system already being configurable or adaptable by means of configuration data to a first injection molding machine. This operating system can then be used with all the configuration data as a digital twin on a target system, making use of a hardware-independent app for converting the information to the target system. Since the machine control software is, in and of itself, already configured on the machine control system of the injection molding machine to the properties of the physically existing machine, with the preferably identical configuration file from the machine control system which is adapted bidirectionally converted to the target system, it is possible to work on the target system with the control screen of the real machine. In this way, datasets and, in particular, settings datasets can preferably be originally created offline or existing settings datasets can be modified there. An executable settings dataset created in this way is then transferred from the target system to the injection molding machine, whereby again an adaptation for the operating system of the machine control system takes place by means of a hardware-independent app. The further settings dataset thus created then usually enables an immediate operation of the injection molding machine.

Preferably, the digital twin is operated on the target system offline from the first injection molding machine and/or as a platform solution in the cloud, so that the injection molding machine can be further operated independently. It is possible simultaneously to prepare the injection molding machine for the production of new injection molding parts and also to check whether the injection molding machine is at all suitable for the production of the next job. In this way, the suitability of the injection molding machine can be checked in advance of a current production, so that down times can be reduced.

Preferably, the target system also receives product information relating to a product to be produced on an injection molding machine, for which a specific calculation of a settings dataset can take place. The calculation takes place on a processor without a postprocessor and without a virtual model of the injection molding machine, since due to the machine configuration and the data available locally or preferably at the manufacturer, all the information is available which enables an executable settings dataset to be generated for the respective injection molding machine.

It is advantageous if an expert knowledge set is made available at least to the target system, but preferably also to the injection molding machine, from which it is apparent which components and which configuration a machine configuration must have so that a settings dataset is also executable on the respective injection molding machine. By this means, both faulty input and also the production of faulty parts can be prevented. At the same time, the run-up or starting phase at the start of production of a new injection molded part is significantly reduced.

Additionally, in an advantageous manner, on the basis of the expert knowledge set and/or on the basis of the existing machine configuration on the respective injection molding machine, it can be checked whether the further settings dataset is executable on the first injection molding machine. For this purpose, sufficient information is available to the processor to enable such calculation and checking. If the result is that this is possible, the corresponding steps are carried out on the existing injection molding machine. If, however, the result leads thereto that the processor ascertains that it is not possible on the injection molding machine provided for the production, then a necessary machine configuration is determined. In this case, according to the method, it is checked whether further injection molding machines are available to the user and whether one of these injection molding machines has a machine configuration required for the production. If this is the case, the production of the injection molded part is passed to the identified other injection molding machine. If no other injection molding machine is identifiable, the user is notified accordingly. By means of this procedure, it is firstly possible to carry out production effectively wherever production is indeed possible and, secondly, the user can discover at an early stage whether production is at all possible at his plant. This has cost advantages and contributes to an effective production.

Preferably, in the context of the notification, the user also receives information concerning with which components the existing machine configuration can be adapted and reconfigured so that the settings dataset is also executable on the injection molding machine. In other words, he receives information regarding how he can equip his injection molding machine if needed, in order to ensure production. Precisely here, the advantage of an early advance calculation is clear since then reconfiguration measures are still possible if needed.

Advantageously, the machine configuration is identified by means of a key, a password or an identifier, which is preferably the machine number, towards the processor. Through this identifier, the current machine configuration is stored in a database which is available either locally at the user or externally, e.g. at the manufacturer. In this database, there is available the essential information, for example, configuration data of the injection molding machine, knowledge data of an expert knowledge set, software functionality data of the operating system of the machine control system or of the injection molding machine, which the user can access with the processor on creating further settings datasets. Precisely when information is preferably also accessible in a database at the manufacturer, the user can be comprehensively informed from there about which additional possibilities are available to him.

This is particularly advantageous if, in the database which is preferably a database at the manufacturer, the current equipment and machine configuration of a respectively identifiable injection molding machine is available and, furthermore, the further extension possibilities are also present there. For a comprehensible decision-making guide, it is also advantageous if there are stored in the database the history of the injection molding machine in respect of its delivered state and later alterations, the service history with regard to service operations performed and/or datasets already created on the injection molding machine which were executable for the production of products on the injection molding machine. This information can be present optionally and also only partially. The same applies for the case that a plurality of injection molding machines is present at a user, for the association and linking of these injection molding machines. Such a database is then contacted by the processor for obtaining further information and/or for reconciling information in order to generate corresponding settings datasets and/or user information therefrom.

A reliable and updated calculation and support can take place, in particular, if the processor is associated with at least the database at the manufacturer or has access to a cloud solution, so that the method can preferably be carried out on the processor at the manufacturer. In this case, it is thus ensured that this information is indeed up to date and does not have to be updated, where relevant, by means of a remote access.

Preferably, the method can be further developed in that update information for an injection molding machine is also accessible on the database, this relating, in particular, to updates relating to the machine configuration and a functional scope of the injection molding machine possibly modified thereby. In this way, a new settings dataset can be made available for the injection molding machine on the basis of the update information, which also makes it easier for the user, where relevant, to make his machine capable of operation for the respective product or, for example, more energy-efficient.

In an advantageous manner, a similarity assistant can be provided which preferably identifies anonymized similarities between already produced products and products to be produced as well as between machine configurations with which products have already been produced and are to be produced, specifically using injection molding machines that are present at different users. With this, knowhow generated by different users together which supports a reliable production of injection molded parts can be accessed. For this purpose, the similarities identified are used for creating the at least one new, or modifying the at least one existing, settings dataset and/or for calculating the further settings dataset.

Further advantages are disclosed by the subclaims and the description below of preferred exemplary embodiments. The features set out individually in the claims are combinable with one another in a technologically useful manner and can be supplemented with explanatory facts from the description and with details from the drawings, whereby further embodiments of the disclosure are disclosed.

BRIEF DESCRIPTION OF THE FIGURES

The disclosure is described in greater detail below, referring to exemplary embodiments illustrated in the drawings, in which.

DETAILED DESCRIPTION

The disclosure will now be described in greater detail, using examples, referring to the attached drawings. The exemplary embodiments are merely examples, however, which should not be regarded as restricting the inventive concept to a particular arrangement. Before the disclosure is described in detail, it should be noted that it is not restricted to the respective components of the device and the respective method steps, since these components and methods can vary. The expressions used here are intended only to describe particular embodiments and are not used restrictively. Furthermore, where the singular or the indefinite article are used in the description or the claims, this relates also to a plurality of these elements, provided it is not clearly indicated otherwise in the overall context.

Figure 4:
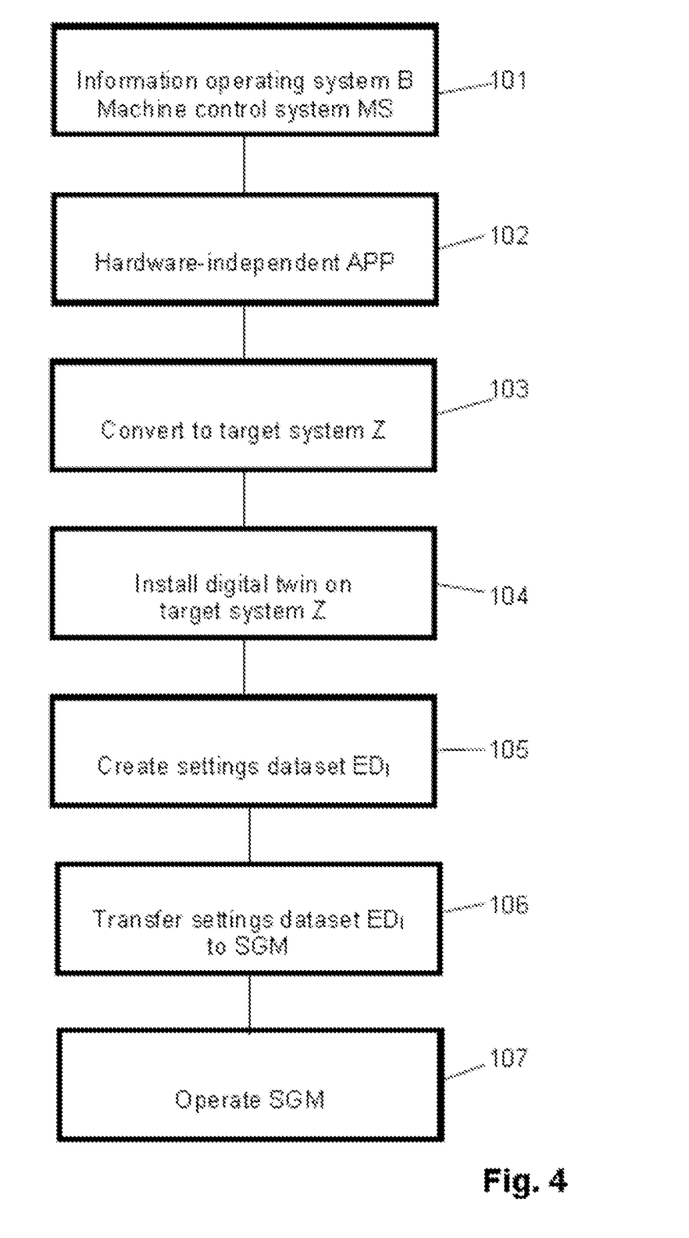
FIG. 4 shows a flow diagram for the creation of an executable settings dataset.

The Figures show a method that is suitable for providing an operating system B of a machine control system MS for an injection molding machine SGM, $SGM_1$ for processing plastics and other plasticizable masses. The operating system B of the machine control system MS is thereby provided on a target system Z which is independent of the injection molding machine, having a processor P. This is described below referring to FIG. 1 in conjunction with FIG. 4.

According to the disclosure, in principle, it is to be made possible to use a copy of an operating system of a machine control system on any desired computer. This preferably identical copy is installed on a target system Z so that only the specific requirements for the display device and the input and output unit predetermined by the target system are adapted during the installation. For this purpose, the drivers that are specific for the target system Z and different from the machine control system MS are installed. For this, a hardware-independent App is provided for the operating system B of the machine control system MS (steps 102, 103). Similarly, information items relating to the operating system B of the machine control system MS of a first injection molding machine SGM, $SGM_1$ are provided, said operating system being configurable or adaptable (step 101) by means of configuration data of a first machine configuration $MK_1$ to the properties of the first injection molding machine SGM, $SGM_1$. In this way, the machine control system MS and/or its operating system B is in and of itself adapted to the properties of the actually available injection molding machine.

With the preferably identical configuration file of the machine control system MS, possibly bidirectionally converted to the respective input and output units of the systems used and, in particular, of the target system Z preferably used offline, the machine control system MS thus also becomes a control copy in the form of a digital twin of the real machine (step 104).

Figure 1:
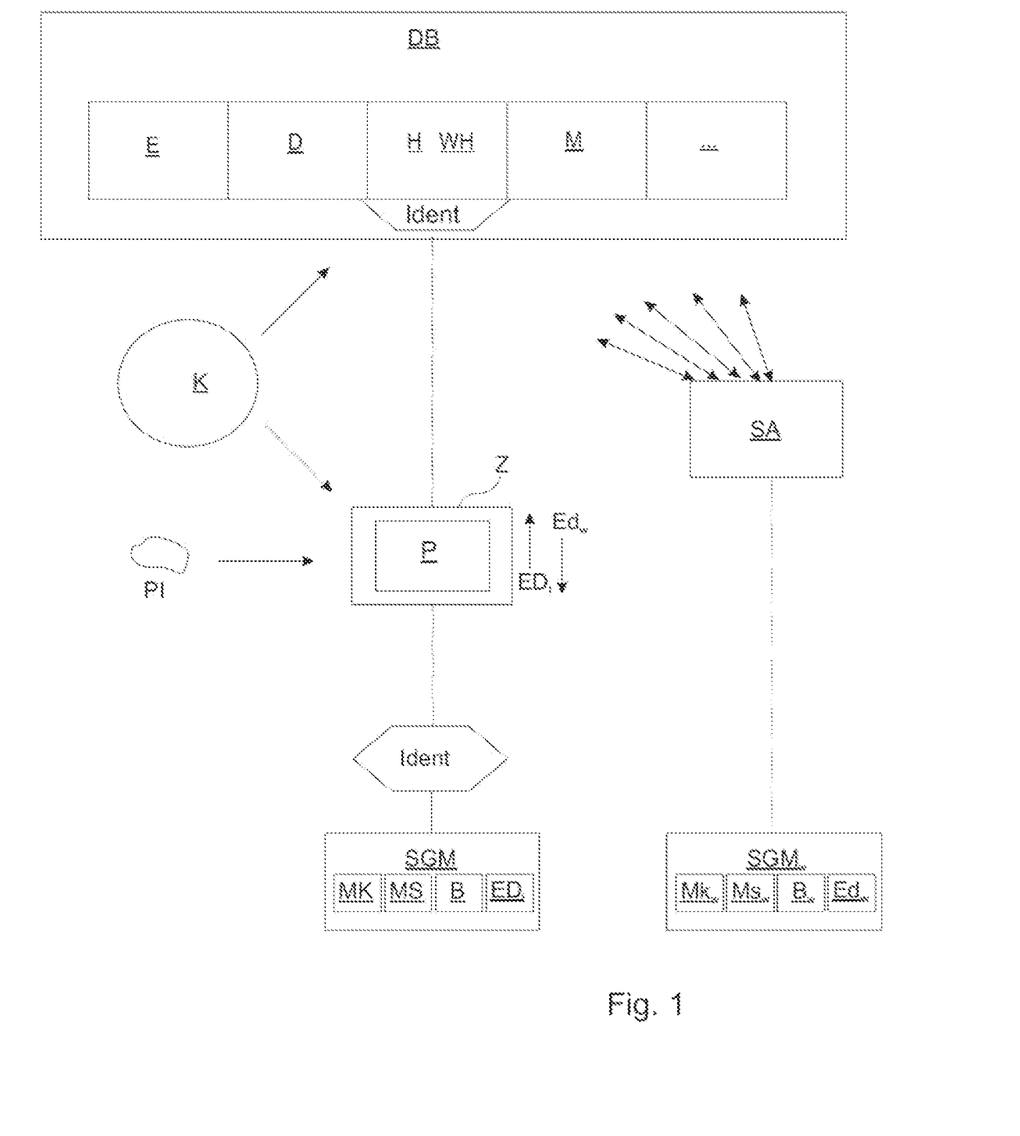
FIG. 1 shows a schematic representation of an injection molding machine cooperating with a processor which has access to a database, if needed.

On the target system Z, at least a new, further settings dataset $ED_w$ can now be created or at least an existing settings dataset $ED_I$ can be modified which is executable for producing injection molded parts on the injection molding machine SGM, $SGM_1$ (step 105). This is shown in FIG. 1, in which the injection molding machine SGM at bottom center in FIG. 1 is connected to the processor P of the target system Z. From there, the executable settings dataset $ED_I$ can be used in order to generate a further settings dataset $ED_w$ and possibly to return it to the injection molding machine. For this purpose, the further settings datasets $ED_w$ created or modified on the target system Z are transferred to the first injection molding machine SGM, $SGM_1$ (step 106). There, the injection molding machine can be operated (step 107) with the dataset $ED_w$ created or modified on the target system.

Preferably, the digital twin of the machine control system MS can be operated on the target system Z offline from the first injection molding machine SGM, $SGM_1$ and/or on the target system as a platform solution in the cloud. In particular, for this purpose, an identification is possibly required using an identifier Ident. While during local operation of the machine according to the method, the machine can be identified by the machine number, and the associated data are present on a local server, a customer identifies himself in a cloud solution by means of a key or a password assigned to the customer. In each case, the respective datasets are transportable and are tested as system files for the respective machine in the context of the processing.

Figure 5:
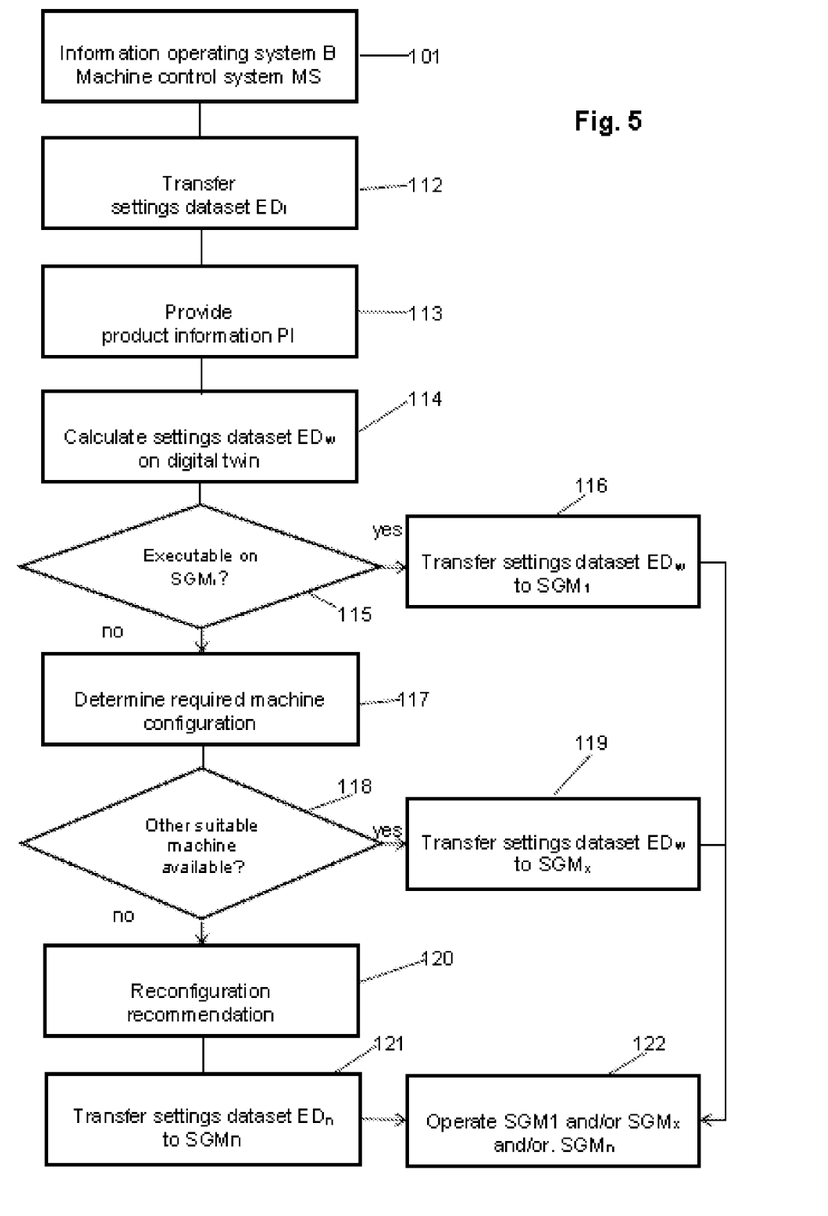
FIG. 5 shows a modified method sequence with integrated executability checking.

According to the method, a first settings dataset $ED_I$ that is executable on the first injection molding machine is transferred to the target system Z, wherein at this time point, information items relating to the operating system B of the machine control system MS (steps 101, 112 in FIG. 5) are already present. Additionally, product information items PI according to FIG. 1 and FIG. 5 (step 113) are provided relating to a product to be produced as an injection molded part on an injection molding machine. Using the information relating to the first machine configuration $MK_1$ and the settings dataset $ED_I$ that is executable on the injection molding machine, a further settings dataset $ED_w$ for producing the product to be produced is now calculated (step 114), wherein the calculation according to FIG. 1 takes place on a processor P. For this purpose, neither a postprocessor nor a virtual model of the injection molding machine is needed.

Figure 3:
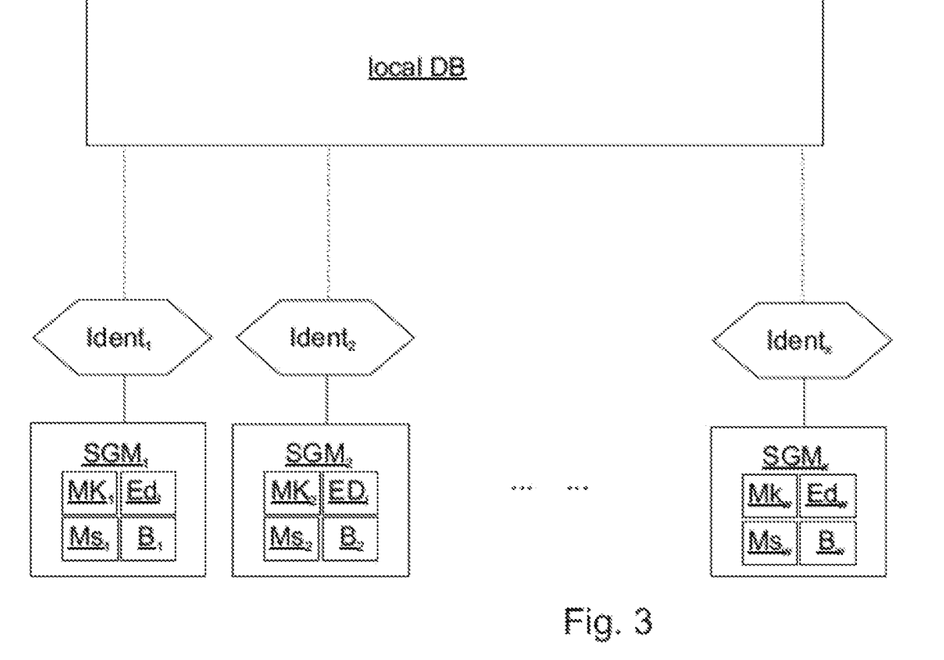
FIG. 3 shows a schematic representation of a plurality of injection molding machines connected to a local database.

Subsequently, the further settings dataset calculated on the digital twin is transferred to the first injection molding machine $SGM_1$ or at least one other injection molding machine SGM, $SGM_2, \ldots, SGM_x$, as set out for the last case illustrated in FIG. 3. The respective injection molding machine can thus be operated with the further settings dataset $ED_w$ for producing the product to be produced.

Figure 2:
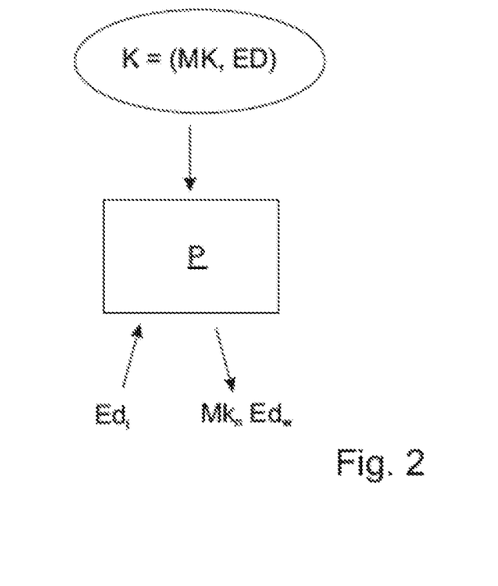
FIG. 2 shows a schematic representation of the processor and the information accessible to it.

FIGS. 1 and 2 show that, if relevant, an expert knowledge set K is provided. This expert knowledge set K contains information regarding which components and which configuration a machine configuration MK must have so that a further settings dataset $ED_w$ is or will be executable on an injection molding machine.

It is advantageous if at this time point, i.e. after the provision of the settings dataset and possibly also on the basis of the expert knowledge set K, it is checked whether the further settings dataset $ED_w$ is at all executable (step 115) on the first injection molding machine $SGM_1$. If this is the case, the respective injection molding machine $SGM_1$ can obtain the settings dataset $ED_w$ and can thus also be operated (steps 116, 122).

If, however, this is not the case, the processor is capable, on the basis of the information provided to it, to determine a machine configuration $MK_n$ (step 117) for the production of an injection molded part to be produced. In this case, in the next step, it is enquired firstly whether a plurality of injection molding machines is available at a user in order to ascertain whether a required machine configuration $MK_n$ is present at another injection molding machine $SGM_2, \ldots, SGM_x$ at the user. If this is the case, the injection molded part to be produced can be operated on the identified other injection molding machine with the further settings dataset $ED_w$. If, therefore, another suitable machine can be identified in step 118, the settings dataset according to step 119 is transferred to the identified injection molding machine and this can be operated accordingly as per step 122. If no other injection molding machine is identified, the user is notified accordingly.

This notification has the advantage for the user that he is now informed that the product cannot be produced at the moment on his injection molding machine. In this way, action can be taken in good time to initiate corresponding reconfiguration work or for alternatives to be considered. Preferably, the notification of the user includes information concerning with which components the machine configuration $MK_1$, MK can be adapted and reconfigured so that the further settings dataset $ED_w$ is executable on the injection molding machine (step 120). In principle, the user receives information therewith regarding how he can reconfigure his machines so that a production of the injection molded part to be produced becomes possible. If the injection molding machine has been reconfigured accordingly, then the new settings database $ED_n$ can be transferred to the correspondingly reconfigured injection molding machine $SGM_n$ (step 121) and the injection molding machine can be operated accordingly (step 122).

According to FIG. 1, the machine configuration $MK_1$, MK of an injection molding machine SGM, $SGM_1$ is preferably identified towards the processor P by means of an identifier Ident which is preferably the machine number or a password or key known to the user in such a way that an access to the current machine configuration in a database DB is provided. This database contains at least the following information:
configuration data of a machine configuration MK, $MK_1$, $MK_w$, $MK_2, \ldots, MK_x$,
knowledge data of an expert knowledge set K,
software functionality data of the operating system B of the machine control system MS or the injection molding machine.

As shown at the top in FIG. 1, this database also has further information since preferably in this database which is particularly preferably a database at the manufacturer, the following information is available to access:

current equipment E and machine configuration MK of a respective injection molding machine identifiable with the identifier Went,
information regarding further extension possibilities M of the equipment E as well as the machine configuration MK of the respective identifiable injection molding machine.

Optionally, the following information can also be present at least partially in the database DB:
a history H of the identifiable injection molding machine with regard to the delivery status and later reconfigurations undertaken since delivery,
a service history WH relating to service operations undertaken,
information relating to datasets D already created on the injection molding machine in the past which were executable on the injection molding machine for the production of injection molded parts,
if a plurality of injection molding machines is operated at the user, an association and linking of this plurality of injection molding machines to one another.

Preferably, the processor P can contact the database DB to receive further information and/or for reconciliation information, in particular if what is required is to create a correspondingly adapted further settings dataset $ED_w$.

It is also advantageous if the database DB shown at top in FIG. 1 is present externally, that is, for example at the manufacturer and an association of the processor P with this database DB takes place. In this case, the method can also be carried out on a processor P at the manufacturer. The data can be provided to the user in any desired manner, whereby access via an app, via the Internet or a cloud-based solution are conceivable.

If a plurality of injection molding machines is available at the user, then it is also possible to determine a preselection of machines that are suitable for the further settings dataset $ED_w$ and also to condition these accordingly. This provides the possibility of creating operational planning for the user in order to be able to produce high value injection molded parts as efficiently and effectively as possible in a time-optimized manner.

With all this information, the processor P is capable, in accordance with FIG. 2, given the existence of an execution-capable settings dataset $ED_l$ with an expert knowledge set K relating to possible machine configurations and settings datasets, to propose a new machine configuration $MK_n$ and to generate a further settings dataset $ED_w$. Similarly, however, the processor P is also capable, without knowledge of an existing settings dataset $ED_l$, of generating a new settings dataset $ED_n$.

In addition, update information for an injection molding machine can be provided on the database DB, this update information comprising, in particular, updates for the machine configuration MK and a thereby modified functional scope of the injection molding machine. It is thereby possible, for example, to provide a new settings dataset $ED_n$ which can be, or at least could be, executed on the injection molding machine on the basis of the update information. This gives the user the possibility of informing himself regarding with which update he can, where relevant, operate his machine still more efficiently.

With the database DB, in particular, if it is provided at the manufacturer, similarities can also be identified by means of the similarity assistant SA shown on the right side in FIG. 1. For this purpose, anonymized similarities between already produced products and products to be produced are preferably also made available, such as similarities between machine configurations MK with which products have already been produced, and machine configurations with which products are to be produced. This takes place using injection molding machines SGM which are preferably present with different users, in order thereby to make an information pool usable. The similarities identified are then used to create the at least one new, or to modify the at least one existing, settings dataset $ED_i$ and/or to calculate the further settings dataset $ED_w$.

It goes without saying that this description may be subject to the most diverse modifications, changes and adaptations which are within the range of equivalents to the attached claims.

The invention claimed is:

1. Method for providing an operating system of a machine control system for an injection molding machine for processing plastics and other plasticizable masses on a target system with a processor, said target system being independent of the injection molding machine, comprising the following steps:
   (a) providing information relating to an operating system of a machine control system of a first injection molding machine configured to operate according to the operating system which is configurable according to configuration data, said operating system being configurable or adaptable by means of configuration data of a first machine configuration to properties of the first injection molding machine,
   (b) providing a hardware-independent App for the operating system of the machine control system,
   (c) installing the operating system for the machine control system with all the configuration data as a digital twin on the target system using the hardware-independent App for converting the information relating to the operating system of the machine control system to the target system, the digital twin configured to operate according to the operating system and the configuration data, including properties, specifications and settings, of the first injection molding system, wherein a configuration file of the machine control system is adapted bidirectionally converted to the target system for offline creation or modification of settings datasets,
   (d) calculating at least one new settings dataset by the digital twin on the target system for producing injection molded parts, which settings dataset is executable on the first injection molding machine,
   (e) transferring a further settings dataset created or modified on the target system to the first injection molding machine,
   (f) operating the first injection molding machine with the further settings dataset.

2. Method according to claim 1, wherein the digital twin is operated in at least one mode of operating it on the target system offline from the first injection molding machine such that the first injection molding machine is operated independently from the digital twin, or operating it on the target system as a platform solution in a cloud such that the first injection molding machine is operated independently from the digital twin.

3. Method according to claim 1, wherein it further comprises the steps:
   (g) transferring the at least one settings dataset that is executable on the first injection molding machine to the target system,
   (h) providing product information to the target system relating to a product to be produced on an injection molding machine as an injection molded part,
   (i) calculating the further settings dataset for producing the product to be produced using the information relating to the first machine configuration and the at least one settings dataset executable on the injection molding machine, on the target system, wherein the calculation takes place on a processor without a post-processor and without a virtual model of the injection molding machine,
   (j) transferring the further settings dataset from the target system to the first injection molding machine or at least one other injection molding machine,
   (k) operating the first injection molding machine or another injection molding machine with the further settings dataset for producing the product to be produced.

4. Method according to claim 3, comprising the step, if a plurality of injection molding machines is available at a user, determining a preselection of injection molding machines suitable for the further settings dataset according to step (i) of claim 3.

5. Method according to claim 1, further comprising the step:
   providing an expert knowledge set regarding which components and which configurations a machine configuration must have so that the further settings dataset is executable on an injection molding machine.

6. Method according to claim 3, comprising the further steps:
   providing an expert knowledge set regarding which components and which configurations a machine configuration must have so that the further settings dataset is executable on an injection molding machine,
   checking after step (i) on the basis of at least one of the expert knowledge set and of the machine configuration present on the injection molding machine, whether the further settings dataset is executable on the first injection molding machine,
   if the answer is positive, carrying out steps (j) and (k),
   if the answer is negative, determining a necessary machine configuration,
   if a plurality of injection molding machines is available at a user, determining whether a required machine configuration is present on another of the injection molding machines available at the user and transferring the further settings dataset to the identified other injection molding machine,
   if no other injection molding machine is identifiable, notifying the user.

7. Method according to claim 6, wherein the notification of the user contains information concerning with which components a machine configuration can be adapted and reconfigured so that the further settings dataset is executable on the injection molding machine.

8. Method according to claim 1, wherein a machine configuration of an injection molding machine is identified in the direction toward the processor by means of an identifier, under which a current machine configuration is stored in a database in which at least one of the following information items is contained: configuration data, knowledge data of an expert knowledge set, software functionality data of the operating system of the machine control system or the injection molding machine.

9. Method according to claim 8, comprising the steps:
   providing update information for an injection molding machine on the database, wherein the update information comprises at least one update for the machine configuration and a functional scope of the injection molding machine modified thereby, providing a new settings dataset for the injection molding machine on a basis of the update information.

10. Method according to claim 8, wherein the identifier is a machine number under which the current machine configuration is stored in the database.

11. Method according to claim 1, comprising the steps:

providing a database, in which the following information items are contained:

current equipment and machine configuration of an identifiable injection molding machine, further extension possibilities of the equipment and the machine configuration of the identifiable injection molding machine, wherein the following information items are contained at least partially:

history of the identifiable injection molding machine with regard to a delivery status and later reconfigurations, service history with regard to service operations carried out, datasets already created on the identifiable injection molding machine which were executable for a production of products on the identifiable injection molding machine, if a plurality of injection molding machines is available at a user, association and linking of this plurality of injection molding machines, contacting the database by the processor for at least one of obtaining further information and reconciliation of information.

12. Method according to claim 11, comprising associating the processor with the database at a manufacturer and carrying out the method on the processor at the manufacturer.

13. Method according to claim 11, wherein providing a database is providing a database at the manufacturer.

14. Method according to claim 1 comprising the steps:

providing a similarity assistant for identifying similarities between already produced products and products to be produced and between machine configurations with which products have already been produced and are to be produced using injection molding machines that exist with different users, using the identified similarities for at least one of creating the at least one new settings dataset or for modifying the at least one existing settings dataset or for calculating a further settings dataset.

* * * * *